Feb. 28, 1956 W. JUDA 2,736,637
WATER HARDNESS MEASUREMENT-METHOD AND APPARATUS
Filed July 24, 1952
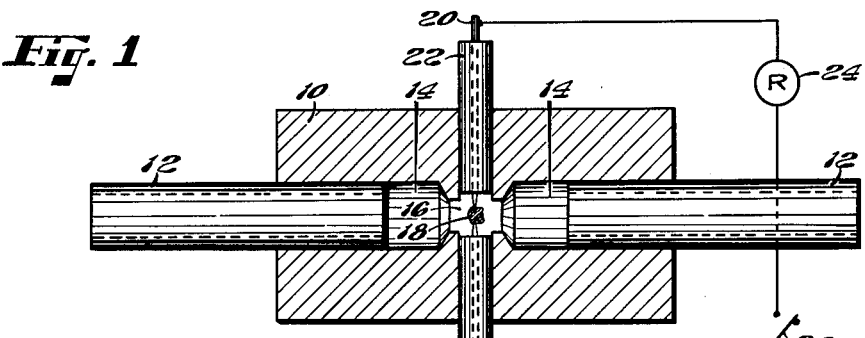
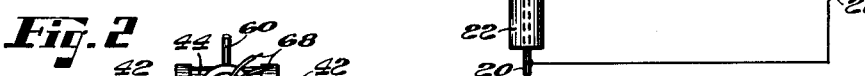
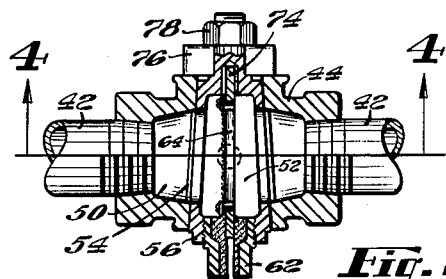
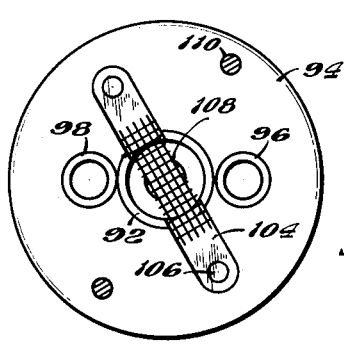
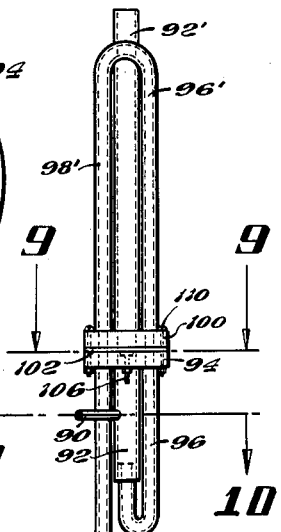
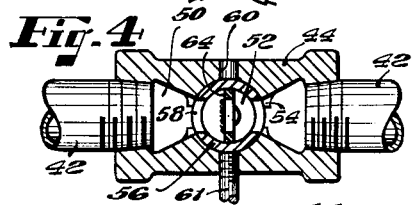
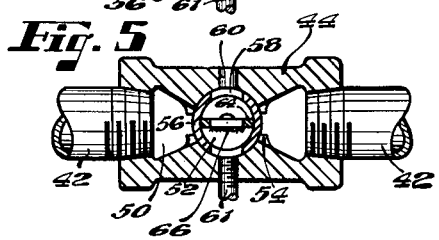
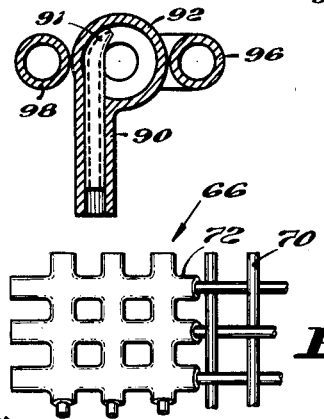
INVENTOR.
WALTER JUDA
BY
Kenway, Jenney, Witter & Hildreth
Attys.

United States Patent Office 2,736,637
Patented Feb. 28, 1956

2,736,637

WATER HARDNESS MEASUREMENT—METHOD AND APPARATUS

Walter Juda, Lexington, Mass., assignor to Ionics, Incorporated, Cambridge, Mass., a corporation of Massachusetts Application July 24, 1952, Serial No. 300,696

8 Claims. (Cl. 23—230)

The present invention relates to a process for determining the relative hardness of water and also to novel apparatus by means of which the new process may advantageously be carried out.

The waters taken from natural sources contain varying amounts of hardness caused by mineral salts. Salts of calcium and magnesium are the principal offenders, although other polyvalent metals are similarly active.

It has long been customary to employ cation exchange materials in water softening devices effective to exchange the offending cations (e. g. Ca and Mg) in the water for sodium ions of the exchange material. Thus water softening as normally practised involves a change in the nature of the mineral salts present in the water, not a removal thereof. When hard water is passed through a bed of zeolite or of an ion exchange resin to effect the exchange of sodium ions from the bed with calcium and magnesium ions from the water, after a given period the bed will be substantially exhausted of its supply of sodium ions and no longer capable of performing the desired exchange. It is then necessary to regenerate the exchanger, usually with a strong brine (NaCl) solution.

Unfortunately, the hardness of water from a given source varies through rather wide ranges and at unpredictable intervals, a fact which renders it impossible to schedule regeneration at regular intervals, unless the bed is so large that regeneration normally takes place long prior to exhaustion of the bed. Such a practice is wasteful in the extreme because the expensive regeneration is carried out each time on a bed which is only partially exhausted.

Although various proposals have been advanced for instruments capable of indicating relative hardness, none have been proved satisfactory. Chemical analysis is time consuming as well as expensive, and while there is a difference in the electrical conductivity of hard and soft water, the difference is not sufficiently great to serve as the practical basis for instrumentation. Consequently in most instances regeneration is effected before it is really necessary.

The primary object of the present invention is to improve the efficiency of water softening installations.

Another object of the invention is to provide a simple and reliable procedure for determining the relative hardness of water in the minimum time.

Another object of the invention is to provide apparatus of modest cost and proportions adapted to provide rapid and accurate indications of the condition of water.

During the immersion of a cation exchange resin in water, the exchanger combines with the various cations in the water in a ratio which is a function of the ratio of their concentrations in the water. It has been discovered that the electrical conductivity of a cation exchange resin varies with the type of ions with which it is associated. For instance, a resin in the sodium form is more conductive than a resin in the calcium form. Accordingly in water softening operation wherein calcium ions are replaced by sodium ions, exhaustion of the exchanger may be detected by providing a body of cation exchange resin in the effluent and periodically measuring its conductivity (or resistance). It is electrically advantageous to make each measurement on the exchanger substantially out of contact with the bulk of the effluent. When calcium appears in the effluent it combines with the resin and is readily detected by the resultant decrease in the conductivity of the resin.

An important feature of the invention resides in immersing in the effluent stream from a softener a member supporting an ion exchange resin (containing sodium ions). During the immersion of the member, ions of the polyvalent metals such as calcium and magnesium replace sodium ions on the member as soon as hardness break-through occurs in the softener. After predetermined immersion periods the conductivity of the member is measured for example by withdrawing it from the water and permitting it to drain. Any resulting decrease in the conductivity of the resin is a sensitive measure of the amount of hardness-causing ions in the water, since the conductivity of an ion exchange resin containing only sodium ions is more than twice as great as one having associated only ions of calcium, magnesium, etc. Consequently a sharp drop in the conductivity of the immersed material is an indication that the water is relatively hard.

Another feature of the invention comprises novel apparatus by means of which the process of the invention may most advantageously be carried out, including a conduit in which is supported a mass of an ion exchange resin, an ohmmeter (or other resistance measuring device) connected across the resin, and means for alternately causing the resin to be immersed in water and to be subjected to a resistance measurement, as for example upon draining.

These and other objects and features of the invention will be more readily understood and appreciated from the following detailed description of preferred embodiments thereof selected for purposes of illustration and shown in the accompanying drawing, in which:

Fig. 1 is a partly diagrammatic view in cross-section through a water tester constructed in accordance with the invention, Fig. 2 is a plan view of another form of apparatus embodying the invention, Fig. 3 is a view in cross-section longitudinally through the device of Fig. 2, Figs. 4 and 5 are views in cross-section along the line 4—4 of Fig. 3 showing the two positions of the valve, Fig. 6 is a view in elevation of the ion exchange grid employed in the device of Fig. 2, Fig. 7 is a view on an enlarged scale showing the ion exchange grid, Fig. 8 is a view in side elevation of a third form of the invention, Fig. 9 is a view in cross-section along the line 9—9 of Fig. 8, and Fig. 10 is a view in cross-section along the line 10—10 of Fig. 8.

One simple form of apparatus by means of which the invention may be advantageously practiced is shown in Fig. 1 wherein there is provided a rod or block 10 of plastic, wood, or other suitable material provided with axial bores 14 dimensioned snugly to receive the ends of a pair of tubes 12, one of which may be connected as a bleeder tube from the effluent conduit of a water softening device. At the center of the block there is a smaller bore or restricted passage 16 communicating with transverse bores serving to receive the ends of a pair of opposed plastic tubes 22 each of which contains a snugly fitting pointed electrode wire 20. Suspended in the passage 16 by the opposed points of the electrodes 20 is a granule or bead of an ion exchange resin 18.

The material forming the ion exchange resin comprising the granule 18 may be any one of a number of conventional materials known to the art. Alternatively a larger bead may be formed in accordance with the process described in the copending application of Walter Juda and Wayne A. McRae, Serial No. 103,784, filed July 9, 1949, now Patent No. 2,636,851, issued April 28, 1953; the said application discloses a convenient process for the formation of large pieces, or membranes, of ion exchange materials.

The ends of the electrodes 20 are connected through suitable leads to an ohmmeter 24, and the circuit is controlled by a conventional single pole switch 26. In practicing the process of the invention with the assistance of the apparatus shown in Fig. 1, one connects one of the tubes 12 to the effluent from a water softening device, and the water is thereby caused to flow past and around the granule 18. At the end of a predetermined period, during which the resin and water preferably, though not necessarily, reach equilibrium, the device is disconnected from the effluent flow and permitted to drain until the granule 18 is again suspended in air. Then the switch 26 is closed and the ohmmeter is read. If the observed resistance is relatively low, the indication is that the sodium ions in the granule 18 have not been exchanged for calcium ions, and it is therefore concluded that the water softener is in a condition where substantially all of the polyvalent metal ions are being removed from the water and that the latter is still satisfactorily soft. On the other hand, if the resistance indicated by the meter 24 is relatively high, that is an indication that sodium ions have left the granule 18 in exchange for polyvalent metal ions, the conclusion being that the effluent is now relatively hard. Obviously, the ohmmeter may be calibrated directly in terms of hardness of the water undergoing tests, the comparison in each case being between the conductivity of a fresh granule associated with sodium ions and the same granule after it has been exposed to the water leaving the water softener. Since the dimensions and exact chemical construction of the granule 18 will of course affect its conductivity, the ohmmeter 24 should include a potentiometer by means of which calibration may be easily effected. While the presence of a film of water on the granule will affect its conductivity, the factor is small and can therefore be neglected.

In the embodiment of the invention shown in Figs. 2–7 arrangements are made for permanently including the hardness indicator in the effluent discharge line from a water softening installation. Here the effluent discharge line is suggested by the pipes 40, and the hardness indicator is shown as inserted in the line. In this embodiment of the invention there is provided aligned pipes 42 between which there is mounted a casing 44 containing the indicating means, the whole being shunted by a by-pass conduit 46 controlled by means of a shut-off valve 48.

Within the casing 44, as best shown in Fig. 3, there are provided a pair of side chambers 50 communicating with a central frusto-conical chamber 52 through relatively narrow slots formed by interior walls 54 integral with the casing 44. Within the chamber 52 there is disposed a hollow frusto-conical valve member 56 provided with slots or ports 58 and arranged for rotation so that the flow of water may pass through the pipes 42 and through the casing 44, or be shut off. Extending transversely through the wall of the casing 44 on the top thereof is a vent 60, and a drain 61 is set into the bottom, both communicating through the slots 58 of the valve 56 with the interior chamber 52. The large end of the valve 56 is bored and threaded to receive a plug 62 which serves to support a substantially rectangular open frame member 64 of insulating material on which, as shown in Fig. 6 there is secured a grid or screen 66, held in place by a pair of metal clamps 67 screwed into the ends of the frame 64. A lead 68 is connected to each end of the grid 66 and brought out axially through the plug 62. The grid 66 is carefully insulated from the valve body.

The nature of the grid 66 is best shown in Fig. 7 wherein it will appear that a mesh or screen 70 of plastic filaments or other insulating material is coated as shown at 72 with an ion exchange resin, this resin originally being preferably placed in association with sodium ions. Integral with the inner end of the insulating frame member 64 is a centering finger 74 received in an appropriate recess in the inner end of the valve 56. The valve is secured in place within the casing 44 by means of a conventional collar 76 and nut 78.

The two positions of the valve 56 are illustrated in Figs. 4 and 5. It will be seen that when the valve 56 is open, as shown in Fig. 4, the effluent passing through the pipes 40 passes also through the interior of the casing 44 and thus around the grid 66. When the valve 56 is turned to the position shown in Fig. 5, the flow through the casing 44 is shut off (at this time the valve 48 should be open to permit the effluent to pass through the by-pass conduit 46). The chamber 52 now drains through the discharge conduit 61, and air enters through the vent 60.

The operation of the device shown in Figs. 2–7 is comparable to that of the device shown in Fig. 1. The valve 48 is closed and the valve 56 is opened until the grid 66 has been immersed in the effluent stream from the softener for a predetermined period. Whenever it is desired to determine the hardness of the effluent stream, the valve 48 is opened and the valve 56 is closed. When the chamber 52 has drained and the grid 66 is suspended in air, the resistance of the grid is measured by means of an ohmmeter (not shown) similar to the meter 24 of Fig. 1. Again, a decrease in the conductivity of the grid serves as an indication that the grid has lost the sodium ions and gained ions of calcium, magnesium, iron or the like. The calibration technique is obvious.

In the two embodiments of the invention described above, it is necessary intermittently to valve the flow of the effluent stream or that portion of it which passes through the indicator. In Figs. 8–10 there is illustrated an embodiment of the invention which does not require any valves or switches but is arranged to give readings intermittently for an indefinite period.

As shown in Fig. 8 there is provided a bleeder conduit 90 leading from the effluent stream of a water softener to a vertical tube 92 secured at its upper end to a disc of plastic material 94 and connected at its lower end to a U-tube 96 which also terminates in the disc 94. A discharge tube 98 is also secured in the disc 94, the arrangement of the tubes being indicated in Fig. 9. Two flat metal strips 104 are secured to the upper surface of the disc 94 by means of a pair of screws 106, and a grid 108 coated with ion exchange material, similar to the grid 66 in Fig. 7, is secured at each end to the strips 104 and arranged to span the mouth of the tube 92. An upper disc 100 fits over the lower disc 94 and is secured in place by a pair of screws 110, a gasket 102 being interposed between the faces of the discs in order to achieve a sealed relation. The upper disc 100 serves as a mount for a U-tube having one leg 96′ in axial alignment with the tube 96, and a second leg 98′ in axial alignment with the tube 98. There is also a third tube 92′ open at its upper end and in axial alignment with the tube 92. This device functions as an intermittent siphon. That is to say the effluent stream entering the device through the bleeder conduit 90 first flows tangentially into the center tube 92 and gradually fills it as well as the tube 96. As the level of liquid in the tubes 92 and 96 rises, the grid 108 becomes submerged. Ultimately the level in the tube 96′ rises until it reaches the top of the inverted U, and the siphon effect causes the tubes 92, 96 and 96′ to drain through the discharge tubes 98′ and 98. When this occurs, the grid 108 is suspended in air which enters through the tube 92'. An ohmmeter (not shown) is connected across the screws 106 which serve as electrodes for the grids 108, and conductivity measurements are made as before. In place of an indicating ohmmeter, a recording ohmmeter may be substituted and, if desired, associated with an alarm system of conventional design by means of which any desired signal may be given when the conductivity of the grid 108 has dropped to a predetermined level. Such a device may be permanently installed in association with the effluent conduit of a water softening device as a means of signalling when regeneration is required. If the water softening system be of a continuously operating type, the device of the invention may be used as a means of detecting any failures.

It has been found that the accuracy of the device shown in Figs. 8–10 may be improved if the bleeder conduit 90 is coupled with an injector tube 91 arranged to discharge substantially tangentially into the tube 92, the result being to create turbulence and thus increase the contact of the grid 108 with the water.

Other means of measuring the resistance of the ion-exchange element without permitting substantial fractions of electric current to by-pass the element through water surrounding the element may be used. For example, when a flat gridlike element serves as the element, one may use two flat rubber (or other insulating) sheets of about the same area as the element which may be pushed against the element, one rubber sheet against each surface of the element, during a resistance measurement.

Having described and illustrated preferred embodiments of the invention what is claimed as new and patentable is:

1. A method of measuring the hardness of water, comprising providing a mass of a cation exchange resin having sodium as the exchangeable ions, measuring the conductivity of the mass after immersion in substantially soft water, immersing the mass in the water to be tested for a predetermined period, draining and again measuring the conductivity of the mass.

2. A method of measuring the hardness of water, comprising providing a mass of a cation exchange resin having sodium as the exchangeable ions, measuring the conductivity of the mass after immersion in substantially soft water, immersing the mass in the water to be tested, draining the water from the mass, and measuring the conductivity of the drained mass.

3. A method of measuring the hardness of water comprising providing a mass of a cation exchange resin having sodium as the exchangeable ions, determining the conductivity of the mass after immersion in substantially soft water, then passing water to be tested over said mass for a predetermined period, draining the mass, and measuring the conductivity of the drained mass to thus determine its loss of conductivity.

4. A method of measuring the hardness of water comprising providing a mass of a cation exchange resin having sodium as the exchangeable ions, determining the conductivity of the mass after immersion in substantially soft water, then passing water to be tested over said mass, draining the mass, and measuring the conductivity of the drained mass to thus determine its loss of conductivity.

5. A device for measuring the hardness of water, comprising walls forming a chamber, a mass of a cation exchange resin within said chamber, said resin having sodium as the exchangeable ions, electrodes contacting said body of resin, means for introducing the water to be tested into said chamber for contact with said resin, means for removing the water from said chamber, and means for measuring the resistance of said resin between said electrodes.

6. A device for monitoring the hardness of water, comprising walls forming a chamber, a non-conducting water pervious structure coated with a cation exchange resin mounted within said chamber, electrodes contacting said resin, means for introducing the water to be tested into said chamber, means for removing the water from said chamber, and means for measuring the resistance of said resin between said electrodes.

7. A device for monitoring the hardness of water, comprising a valve having a non-conducting rotatable body, nonconducting water-permeable structure coated with a cation exchange resin mounted within said body, electrodes contacting said resin at opposed ends of said structure, means for introducing the water to be tested into said body, means for diverting the flow of water to apparatus operating with said water, means for removing the water from said body, and means for measuring the resistance of said resin between said electrodes.

8. The device of claim 6 wherein the non-conducting water-pervious structure is in the form of a grid having a continuous surface coating of a cation-exchange resin.

References Cited in the file of this patent

UNITED STATES PATENTS

| | | |
|---|---|---|
| 2,422,054 | Tiger | June 10, 1947 |
| 2,628,194 | Gilwood | Feb. 10, 1953 |
| 2,636,851 | Juda | Apr. 28, 1953 |
| 2,681,320 | Bodamer | June 15, 1954 |

FOREIGN PATENTS

| | | |
|---|---|---|
| 693,166 | Great Britain | Oct. 19, 1950 |